March 26, 1968   F. A. ROSSI   3,375,137
ELECTRIC STORAGE BATTERIES OF THE LEAD-SULPHURIC
TYPE AND METHOD OF MAKING THE SAME
Filed Sept. 3, 1965
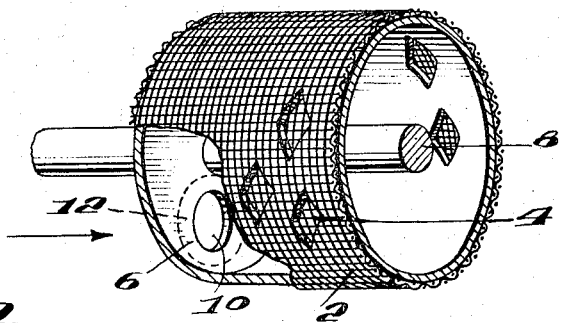
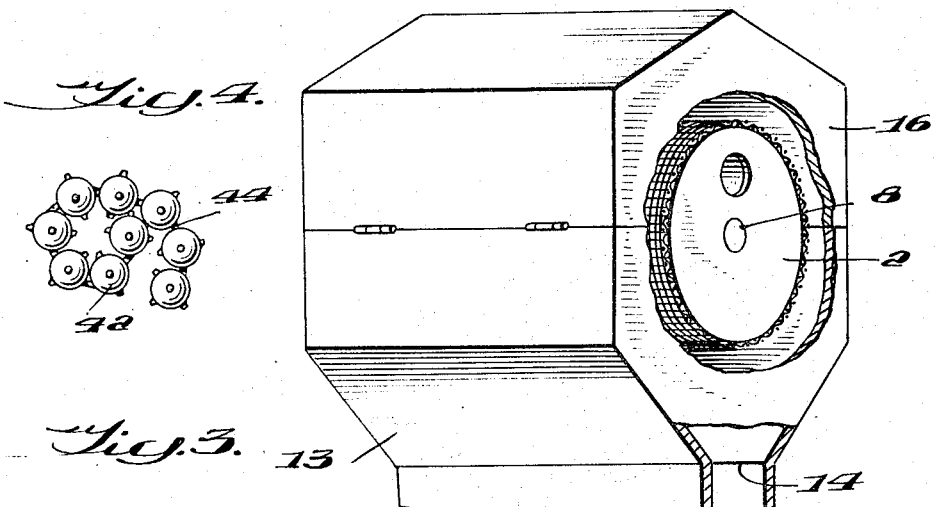
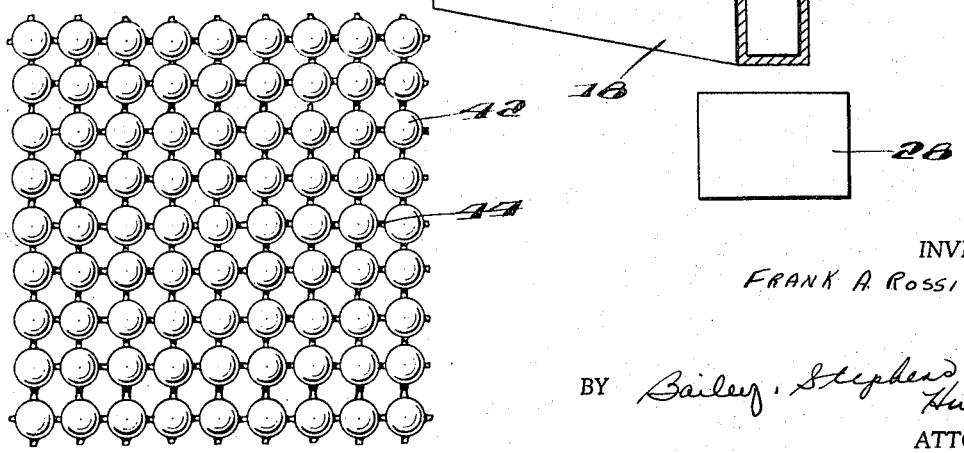
INVENTOR
FRANK A. ROSSI
BY Bailey, Stephens & Huettig
ATTORNEYS

*United States Patent Office*

3,375,137
Patented Mar. 26, 1968

3,375,137
ELECTRIC STORAGE BATTERIES OF THE LEAD-SULPHURIC TYPE AND METHOD OF MAKING THE SAME
Frank A. Rossi, York, Pa., assignor to R & C Kem Lab. Co. Inc., Hopewell Junction, N.Y.
Continuation-in-part of application Ser. No. 418,718, Dec. 16, 1964. This application Sept. 3, 1965, Ser. No. 485,042
18 Claims. (Cl. 136—27)

This application is a continuation-in-part of my application Ser. No. 418,718, filed Dec. 16, 1964, which is a continuation-in-part of my application Ser. No. 180,145, filed Mar. 16, 1962, now abandoned.

The invention relates to storage batteries and elements therefore, as well as the method of making such batteries and elements.

What are normally called storage batteries are more accurately called secondary or chemical cells. They are an aggregation of two or more such cells, in which the reversible transformation of chemical energy to electrical energy takes place.

The original lead-acid type secondary cells required from three months to two years of "forming" in order to reduce the lead oxide to sponge lead and oxidize the metallic lead to a lead oxide. At a later date, lead compounds were "pasted" onto a lead plate, which considerably reduced the time necessary for forming the battery. Thereafter reticular grids were used into which the lead pastes were forced. At a still later date, the so-called "dry-charged" batteries were introduced, in which controlled superheated steam was used for setting the paste and for drying out the charged negative plates.

While present day storage cells are much improved, there are still many drawbacks of such cells. In the first place, when the cells stand for long periods of time, they are likely to lose their charge and cannot deliver energy when needed, or may even be completely ruined. Likewise, in most batteries, the rate of discharge drops fairly rapidly as the battery discharges, so that it cannot deliver full power throughout substantially the whole of its cycle of discharge.

Another disadvantage of conventional batteries is that they are adversely effected by low or high temperatures. Another disadvantage of conventional batteries is that they may be damaged or destroyed if the charging current is applied to them with the wrong polarity. Likewise, the rate at which they may be charged is limited. Again, such batteries are complicated to manufacture since the positive and negative plates must be of different types; and made from different starting materials.

The primary object of the present invention is to provide a battery which has very distinct advantages over those of the prior art, particularly in the respects to be set forth hereinafter.

I have found that batteries made according to the present invention show no substantial power loss on standing idle for one year or more with the electrolyte in the battery, and can be put into high demand service at the end of such time without being re-charged and without suffering any damage. Likewise, even a completely discharged battery produced according to the invention can be left idle for a long time and then completely re-charged without suffering damage.

Another object of the invention is to provide a battery which will deliver substantially its full rated power throughout more than 90% of the discharge cycle. Furthermore, the battery will deliver full power at temperatures ranging from −30° F. to +160° F.

The battery according to the invention will store more amperes of energy than any conventional battery of equal size. Its rates of charge and re-charge are at least five times greater than conventional batteries, and it is capable of such rates without any damage to the battery or any of its components. Likewise, the battery may be charged with reverse polarity without injuring the battery or any of its parts.

The battery likewise will operate cooler than conventional batteries. The battery plates produced with our paste made from active material produced according to the invention, are mechanically harder, sounder and tougher and the finished battery will withstand high shocks and vibrations without damage, and the service life of the battery is greatly increased.

A further object of the invention is to provide a battery plate in which both positive and negative plates are produced from the same starting materials, greatly reducing manufacturing costs; in comparison with the conventional battery plate produced with two different starting materials, one for the positive and a different one for the negative.

Another object of the invention is to provide a battery plate of which the positive and negative plates are produced of the same weight, thereby reducing manufacturing costs, in comparison with the conventional battery plates of two different weights.

A further object of the invention is to provide a method of making secondary cells in less time by increasing the charging current to 5 times greater than is conventional without any damage to the cell. With the conventional battery cell, in order to avoid damage to it, the usual charging current used is 0.75 to 1.50 ampere per positive plate. For plates of the conventional type a current density of 2 to 5 amperes per square foot is usually used.

Another object of the invention is to provide a battery plate for a battery structure which is compact, lighter and more efficient in the production of the elements for the battery according to the present invention.

A further feature of the invention is that positive and negative plates, both of the same material, may be both formed and finished in a single step, in a manner to be described hereinafter.

According to the invention, conventional grids or supporting plates are used. The paste which is supplied to these plates however is novel. This paste is produced by grinding substantially pure lead, in the presence of limited amounts of oxygen, to a fine consistency. The resulting powder contains, in general, substantially equal proportions of lead, lead oxide and hydrated lead oxide and is substantially free of lead suboxide. A paste of this powder is made by adding sulphuric acid, and the paste is then applied to the grids. The plates are then formed in the conventional manner.

The lead powder is produced by attrition in a mill of cylindrical groups of connected lead balls, these groups each having a large number of projections exposed at one time. The process of attrition is carried out in such a way that the temperature in the mill does not rise above about 135°.

Further objects and advantages of the invention will appear more fully from the following description, particularly when taken in conjunction with the accompanying drawings, which form a part thereof.

In the drawings:
FIG. 1 shows in perspective, partly in section, a mill for grinding the lead balls which are to form the powder for the paste;
FIG. 2 shows the mill casing;
FIG. 3 shows a sheet of lead balls; and
FIG. 4 shows the balls rolled up for introduction into the mills.

According to the invention, substantially pure lead of (99.99+) is used. Furnace heat should be maintained between 800° F. and 900° F. in order to obtain from the molds the proper lead spheres. The spheres 42 are 9/16 inch in diameter, joined to surrounding spheres by 1/16 inch diameter legs 44 in the form of sheets containing 9 spheres on all four sides, measuring 5½ inches square. These sheets of lead spheres are rolled into a shape (FIG. 4) measuring 5½ inches long by 1¾ inches in diameter to be used to charge the mill of the type shown in FIGS. 1 and 2.

This mill includes a drum 2, 25 inches long and 40 inches in circumference, having staggered rows 4 of openings therein, these openings being diamond-shaped with the longer dimension lying in a plane transverse to the axis of the drum. The drum is closed at each end by end wall 6 and is mounted to rotate with a shaft 8 1.75 inch in diameter which is secured in each end wall. The drum is firmly wrapped and secured over the entire outside circumference of the drum, with a nonferrous type screen 9 of at least 100 mesh or more per inch (U.S. standard sieve series).

The shaft size is important in supporting the drum at both ends of the housing of the mill and also acting as a dividing medium for the lead spheres half way between the interior side walls of the drum for better attrition and less heat accumulation. The dimensions of the opening 4 are 5/16 inch by 1/32 inch.

In one end wall of the drum 6 there is an opening which is closed by the cover plate 10, this cover plate having a flange 12 on the outside wall by which it can be secured, and itself extending into the opening so as to present a surface flush with the inner surface of the wall 6.

The drum is mounted in a wooden housing having inwardly inclined bottom walls 13 separated at their lower ends by an open slot 14, and a removable top 16. Below slot 14 is a sloping trough 18 through which the lead powder can slide to a container 20. Seals are provided along the lower edges of the top 16.

In use the cover 10 is removed and sheets of lead spheres of the type shown in FIG. 4, rolled into a tubular shape measuring 5½ inches long by 1.75 inches diameter, are introduced inside the drum until the axle 8 inside of the drum is completely covered. The mill is then run for about 15 minutes at a speed of between 58 and 59 r.p.m. and the charging operation is repeated at 15 minute intervals until the axle inside the drum is completely covered with the lead spheres approximate 1 inch above the axle, about 60 to 80 pounds of lead. The mill is then operated for a period of 8 hours, producing 40 lbs. of powder. At the end of each 8 hours of run, the mill is ready to be reloaded with 40 pounds of rolled lead spheres. This operation can be continuous or run at intervals, providing the weights of lead spheres and time involved are calculated properly.

The housing is formed of ¾ inch plywood assembled into a container of the following dimensions: 21½ inches wide by 37½ inches long by 19½ inches high at two sides, divided into two equal sections, the upper half being hinged to the lower half so that it can be opened to gain access to cover 10 to remove and reload the mill. The plywood container is supported by angle irons (¼ x ¼ x 2 inch) 37¾ inches long bolted upright to the four sides of the housing starting at the lower half of the housing leaving the upper half free to be opened and closed when needed.

The two ends of the housing are of plywood measuring 22 inches long by 21½ inches wide, and are tapered to a 6 inch opening 14 at the bottom. Since the housing is substantially air tight above the opening 14, and since the air therein is heated by the attrition process, the air in the housing does not tend to circulate out of the bottom and the attrition takes place in an entrapped, substantially non-circulating body of air which is only renewed at the end of each eight hours when the drum is recharged.

At the end of the operation, the resulting powder, which has a blue-green color, has the following characteristics:

Analysis:
  Metallic lead (Pb) _____ 31.6
  Lead oxide (PbO) _____ 40.0
  Lead hydrate (2PbOH$_2$O) _____ 28.3
  Specific gravity _____ 9.2

Mesh:
  +30 _____ 3.0
  +40 _____ 4.0
  +50 _____ 2.4
  +60 _____ 5.3
  +70 _____ 4.0
  +80 _____ 4.5
  +100 _____ 5.4
  +150 _____ 8.9
  +200 _____ 10.2
  −200 _____ 52.6

The blue-green color which differentiates this material from the black product obtained in the usual Shimadzu process is believed to be due to the presence in the Shimadzu product of a complex of lead oxyhydrates and PB$_2$O. PB$_2$O was originally reported by J. J. Berzelius in Gilbert's Ann. 40:166, 186 (1822), confirmed by F. Glasser, P. Sabatier, J. B. & J. D. Bousingault and J. Pelouze among others, and by R. W. E. McIver–C.N.: 86,192 (1902) and similarly by L. Guthershohn (chem. Zeitg.). The composition therein described varies somewhat as a function of the amount of lead in the attrition mill and the relative humidity of the air. This is controlled according to the present invention within limits by a system in which the volume of the lead spheres (its surface area) and the other conditions are properly controlled. Collecting trough 18 is constructed out of ¾ inch plywood with the following dimensions: 4 inches high by 13 inches wide and 41 inches long open at one end so that the powder can be collected into a suitable container 20 to be removed from the bottom of the mill. The collection trough is placed underneath the opening of the mill in a tapering position starting at 6 inches away from the bottom of the opening at the rear of the mill to a slope of 9 inches to the front of the mill. The collecting trough is placed so that it encompasses the entire opening at the bottom of the mill. This factor also further distinguishes from older procedures, in which air is actually forced into his mill, producing a very flammable product.

The powder produced by the mill is in the form of surface oxidized and partly hydrated spiculate, foliate and rosetted lead. It is collected in a container of non-metal type not to exceed the weight of 100 pounds for each container.

In order to protect the varying granular shapes of the powder and avoid the effect of the temperature, the weight, shapes and container size are of importance in the control of the powder in obtaining the best results.

To each 100 pounds of powder produced by the mill the following products are added, 50 grams of Anisic Acid (powder), 50 grams of tellurium (Te), 60 grams of magnesium sulfate (MgSO$_4$), 60 grams of Sodium Sulfate (NaSO$_4$), and 15 grams of Cadmium Sulfate (CdSO$_4$), greater amounts up to 5 ounces of each or even more could be used.

This prepared powder of 100 pounds can be stored, the time of this storage causing no modification. Such powder when needed as a paste mix to impaste grids, is to be prepared in the following method, to each 100 pounds of powder, FIRST STEP add 3 gallons of water (H$_2$O) and mix approximately 15 minutes, SECOND STEP add 40 ounces of concentrated sulfuric acid (specific gravity 1.83) and mix for another 15 minutes until a stiff paste is obtained of a consistency usual in the manufacture of battery plates. The paste is then applied to the lead grids. After they are pasted, said plates may be flash-dried by an oven or air dried and stacked for drying and curing, which will control the residual moisture, atmospheric humidity and the surrounding temperature. These three factors control the reduction of the free lead content of the plate approximately from 30% to 1%. The paste has the following constant composition (exclusive of the small amounts of additives) Lead (Pb) 1%, Lead Oxide (PbO) 71.7%, Lead Hydrate ($_2$PbOH$_2$O) 28.3%. Battery plates so produced are of a superior quality, lighter, and have better cohesion and greater capacity, as compared to plates which have been produced to date. Such plates can be stored without damage or finished into battery elements.

After the above process is completed, the plates are ready to be made into elements for the battery or stored indefinitely until needed to produce elements for the battery without damage to the stored plate. The plates can also be used in a wet state, being put directly from the pasting process into a forming tank or case by allowing the wet plate to soak in the electrolyte for at least half an hour before applying the electrical current.

EXAMPLE 1

*Step 1 forming*

The plates, immersed in sulphuric acid of specific gravity 1.029, are connected alternately as anodes and cathodes and subjected to a current of a strength to produce a flow of as much as 10 amperes per positive plate (this may range between ½ and 10 amperes or the equivalent of 1½ to 30 amperes per square foot, calculated by the surface area of both sides of the positive plate). This is for plates 0.06 inches thick, and is increased proportionally for thicker plates, being 24 to 480 amperes per square foot per inch of thickness of the plate for each positive plate. This operation is continued until a reading of 2.3 to 2.5+ is obtained, by means of a voltmeter attached with a cadmium stick, placed over the plates while on charge position. After completing the above process, the plates are finished forming and are distinguished by the following colors obtained in the forming process: the positive plate a chocolate-brown, and the negative plate a silvery gray cast. The time required in forming the plate is calculated by the thickness of the positive plate and the ampere hour rating of the plate.

*Step 2 Finishing*

Follow the same procedure as described in Step 1 above, with only one exception, the change or transfer of the plates from the sulphuric acid (specific gravity 1.029) to whatever specific gravity of sulphuric acid is desired for the finished battery. The resulting plates are used to produce the finished battery, and will have the improved characteristics described herein.

Still further improvements, including the ability to deliver 50% more energy, may be obtained if the pasted plates are connected as cathodes along with a bare lead grid, as anodes, in sulphuric acid of specific gravity 1.120 to which is added, after the current is applied, 2 ounces of a solution of 10% nitric acid for each 10 ounces of paste on the plates. The plates are charged for two hours subject to approximately 2 amperes per positive plate. After the treatment is completed they are removed, and washed in hot water until free of all acid as indicated by the litmus paper test. Such treated plates are to be used only as positive plates in conjunction with a non-charged negative plate for battery elements.

The initial starting compound is the same for both positive and negative plate.

I have further found that the forming and finishing may be carried out in one operation, the assembled positive and negative plates being subjected to a current of 6 to 9 volts in sulfuric acid to specific gravity 1.235, at the ampere rating of the battery, for 1½ hours. This considerably reduces the cost of manufacture and at the same time produces further improvement in the battery.

The differences from prior starting plates, that is, the matrix itself as well as the processes to which it is subjected, account for the extraordinarily long life of the finished battery, the strength of the plates, and the high rates of charge and discharge which it will withstand. The same differences in composition account for the long shelflife of this battery.

It is an important feature of the invention that, since the paste composition of all plates is the same, and since the paste is derived from the surface oxidized and partly hydrated spiculate, foliated and rosetted lead particles, the matrix of the plate mix (having more Pb to Pb contact points) has less internal resistance than the plates known to the art. This particle to particle contact is so positive that it is apparently equal to the conductive efficiency of the grid structure itself. This also makes for a high strength plate which may even be dried in the air without fissuring to make dry-charged plates without the use of superheated steam. Further, the surface area is more uniform and greater than that of the ordinary plate without substantial damage. As a consequence of these features, higher rates of charge and discharge may be tolerated by the plates formed by the methods of this disclosure than can be borne by any other plate previously known in this art. For this reason, also, the plates so prepared will even withstand polarity reversals during charge or discharge without damage.

While I have described herein some embodiments of my invention, I wish it to be understood that I do not intend to limit myself thereby except within the scope of the claims hereto or hereinafter appended.

I claim:

1. A method of making battery plates which comprises tumbling substantially pure lead balls in an entrapped body of air to form a powder while maintaining the temperature below about 135° F., mixing this powder with sulphuric acid to form a paste, applying the paste on a grid to form a plate and forming and finishing the resulting plate, the quantity of air being such as to produce surface oxidized lead substantially free of lead suboxide and composed principally of lead oxide (PbO) and lead hydrate [Pb$_2$O(OH)$_2$].

2. A method as claimed in claim 1 in which at least substantially half of the powder has a particle size below 200 meshes to the inch.

3. A method of making battery plates which comprises tumbling substantially pure lead balls in an entrapped body of air to form a powder while maintaining the temperature below about 135° F., mixing this powder with sulphuric acid to form a paste, applying the paste on a grid to form a plate and drying and thereafter forming and finishing the resulting plate, the quantity of air being such as to produce surface oxidized lead substantially free of lead suboxide and composed principally of lead oxide (PbO) and lead hydrate [Ph$_2$O(OH)$_2$].

4. A method of making battery plates which comprises tumbling substantially pure lead balls in an entrapped body of air to form a powder while maintaining the temperature below about 135° F., mixing this powder with sulphuric acid to form a paste, applying the paste on a grid to form a plate, treating the resulting plate while still wet with sulphuric acid, and thereafter forming and finishing the treated plate, the quantity of air being such as to produce surface oxidized lead substantially free of lead suboxide and composed principally of lead oxide (PbO) and lead hydrate [Pb$_2$O(OH)$_2$].

5. A method of making battery plates which comprises tumbling substantially pure lead balls in an entrapped body of air to form a powder while maintaining the temperature below about 135° F., mixing this powder with sulphuric acid to form a paste, applying the paste on a grid to form a plate, subjecting the plates as cathodes to electrical current in the presence of sulphuric and nitric acids, and thereafter forming and finishing the plates, the quantity of air being such as to produce surface oxidized lead substantially free of lead suboxide and composed principally of lead oxide (PbO) and lead hydrate [$Pb_2O(OH)_2$].

6. A method of making battery plates which comprises tumbling substantially pure lead balls in an entrapped body of air to form a powder while maintaining the temperature below about 134° F., mixing this powder with sulphuric acid to form a paste, applying the paste on a grid to form a plate, forming the resulting plates by subjecting them as anodes and cathodes to an electrical current in the presence of sulphuric acid, and finishing the formed plates by subjecting them as anodes and cathodes to electric current in the presence of sulphuric acid of substantially higher concentration, the quantity of air being such as to produce surface oxidized lead substantially free of lead suboxide and composed principally of lead oxide (PbO) and lead hydrate [$Pb_2O(OH)_2$].

7. A method of making battery plates which comprises tumbling substantially pure lead balls in an entrapped body of air to form a powder while maintaining the temperature below about 135° F., mixing this powder with sulphuric acid to form a paste, applying the paste on a grid to form a plate, subjecting the plates as cathodes to electrical current in the presence of sulphuric and nitric acids, forming the resulting plates by subjecting them as electrodes to an electrical current in the presence of sulphuric acid, and finishing the formed plates by subjecting them as electrodes to an electrical current in the presence of sulphuric acid of substantially higher concentration, the quantity of air being such as to produce surface oxidized lead substantially free of lead suboxide and composed principally of lead oxide (PbO) and lead hydrate [$Pb_2O(OH)_2$].

8. A method of making battery plates which comprises tumbling substantially pure lead balls in an entrapped body of air to form a powder while maintaining the temperature below about 135° F., mixing this powder with a sulphuric acid to form a paste, applying the paste on a grid to form a plate and forming and finishing the resulting plates by subjecting them as electrodes to an electrical current of 24 to 480 amperes per square foot per inch of thickness for each positive plate in the presence of sulphuric acid with a specific gravity of substantially 1.235, the quantity of air being such as to produce surface oxidized lead substantially free of lead suboxide and composed principally of lead oxide (PbO) and lead hydrate [$Pb_2O(OH)_2$].

9. A method of making battery plates which comprises tumbling substantially pure lead balls in an entrapped body of air to form a powder while maintaining the temperature below about 135° F., mixing this powder with sulphuric acid to form a paste, applying the paste on a grid to form a plate, forming the resulting plates by subjecting them as electrodes to an electrical current of 24 to 480 amperes per square foot per inch of thickness for each positive plate in the presence of sulphuric acid with a specific gravity of substantially 1.029 until a positive plate shows a voltage of 2.3 to 2.5 volts and thereafter finishing the formed plates by subjecting them as electrodes to electric current of about 24 to 480 amperes per square foot per inch of thickness for each positive plate in the presence of sulphuric acid with a specific gravity of about 1.275, until the positive plates show a voltage of about 2.3 to 2.5 volts, the quantity of air being such as to produce surface oxidized lead substantially free of lead suboxide and composed principally of lead oxide (PbO) and lead hydrate [$Pb_2O(OH)_2$].

10. A method of making battery plates which comprises tumbling substantially pure lead balls in an entrapped body of air to form powder while maintaining the temperature below about 135° F., mixing this powder with sulphuric acid to form a paste, applying the paste on a grid to form a plate, subjecting the formed plates as cathodes to electrical current of about 24 to 480 amperes per square foot per inch of thickness in the presence of sulphuric acid with a specific gravity of substantially 1.029 and containing 10% nitric acid in an amount by weight about one-fifth of the weight of said powder, and thereafter forming and finishing the plates, the quantity of air being such as to produce surface oxidized lead substantially free of lead suboxide and composed principally of lead oxide (PbO) and lead hydrate [$Pb_2O(OH)_2$].

11. A method of making battery plates which comprises tumbling substantially pure lead balls in an entrapped body of air to form a powder while maintaining the temperature below about 135° F., mixing this powder with sulphuric acid to form a paste, applying the paste on a grid to form a plate, subjecting the formed plates as cathodes to electrical current of about 24 to 480 amperes per square foot per inch of thickness in the presence of sulphuric acid with a specific gravity of substantially 1.029 and containing 10% nitric acid in an amount by weight of about one-fifth of the weight of said powder, thereafter subjecting plates as electrodes to an electrical current of 24 to 480 amperes per square foot per inch of thickness for each positive plate in the presence of sulphuric acid with a specific gravity of substantially 1.029 and thereafter finishing the formed plates by subjecting them as electrodes to electric current of about 24 to 480 amperes per square foot per inch of thickness for each positive plate the presence of sulphuric acid with a specific gravity of about 1.275, the quantity of air being such as to produce surface oxidized lead substantially free of lead suboxide and composed principally of lead oxide (PbO) and lead hydrate [$Pb_2O(OH)_2$].

12. A method of producing a lead product for use in the production of storage battery plates which comprises subjecting to attrition in a mill in the presence of limited quantities of air a plurality of lead balls having each a larger number of protrusions therefrom, the temperature within the mill being maintained below about 135° F., and the quantity of air being such as to produce surface oxidized lead substantially free of lead suboxide and composed principally of lead oxide (PbO) and lead hydrate [$Pb_2O(OH)_2$].

13. A method of producing a lead product for use in the production of storage battery plates which comprises subjecting to attrition in a mill in the presence of limited quantities of air while maintaining the temperature below about 135° F., a plurality of connected lead balls in the form of a substantially cylindrical body, the quantity of air being such as to produce surface oxidized lead substantially free of lead suboxide and composed principally of lead oxide (PbO) and lead hydrate [$Pb_2O(OH)_2$].

14. A method of producing storage battery plates which comprises subjecting to attrition in a mill in the presence of limited quantities of air a plurality of lead balls having each a large number of protrusions therefrom, while maintaining the temperature below about 135° F. thereby producing a powder, mixing this powder with sulphuric acid to form a paste, applying the paste on a grid to form a plate and forming and finishing the resulting plate, the quantity of air being such as to produce surface oxidized lead substantially free of lead suboxide and composed principally of lead oxide (PbO) and lead hydrate [$Pb_2O(OH)_2$].

15. A method of producing storage battery plates which comprises subjecting to attrition in a mill in the presence of limited quantities of air a plurality of lead balls having each a large number of protrusions therefrom, while maintaining the temperature below about 135° F. thereby producing a powder, mixing this powder with sulphuric acid to form a paste, applying the paste on a grid to form a plate, and forming the resulting plates by subjecting them as anodes and cathodes to an electrical current in the presence of sulphuric acid, the quantity of air being such as to produce surface oxidized lead substantially free of lead suboxide and composed principally of lead oxide (PbO) and lead hydrate $[Pb_2O(OH)_2]$.

16. A method of producing storage battery plates which comprises subjecting to attrition in a mill in the presence of limited quantities of air a plurality of connected lead balls in the form of a substantially cylindrical body, while maintaining the temperature below about 135° F. thereby producing a powder, mixing this powder with sulphuric acid to form a paste, applying the paste on a grid to form a plate and forming and finishing the resulting plate, the quantity of air being such as to produce surface oxidized lead substantially free of lead suboxide and composed principally of lead oxide (PbO) and lead hydrate $[Pb_2O(OH)_2]$.

17. A battery plate comprising a grid having thereon a sulfuric acid paste of a powder consisting essentially of lead-oxide in the form of surface oxidized and partly hydrated spiculate, foliate and roseate lead substantially free of lead suboxide and composed principally of lead oxide (PbO) and lead hydrate $[Pb_2O(OH)_2]$.

18. A battery comprising positive and negative plates as claimed in claim 17, a battery acid in contact with the plates.

References Cited

UNITED STATES PATENTS

| | | | |
|---|---|---|---|
| 1,888,823 | 11/1932 | Hall | 23—146 |
| 3,084,207 | 4/1963 | Hughes et al. | 136—27 |

ALLEN B. CURTIS, *Primary Examiner.*

WINSTON A. DOUGLAS, *Examiner.*

A. SKAPARS, B. OHLENDORF, *Assistant Examiners.*